(12) United States Patent
Gindin et al.

(10) Patent No.: US 7,143,285 B2
(45) Date of Patent: Nov. 28, 2006

(54) PASSWORD EXPOSURE ELIMINATION FOR DIGITAL SIGNATURE COUPLING WITH A HOST IDENTITY

(75) Inventors: Thomas L. Gindin, Potomac, MD (US); Messaoud Benantar, Austin, TX (US); James W. Sweeny, Millbrook, NY (US); John C. Dayka, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 09/862,797

(22) Filed: May 22, 2001

(65) Prior Publication Data
US 2003/0009662 A1    Jan. 9, 2003

(51) Int. Cl.
*H04L 9/00* (2006.01)

(52) U.S. Cl. .................. 713/156; 713/175
(58) Field of Classification Search ........... 713/156, 713/175
See application file for complete search history.

(56) References Cited

U.S. PATENT DOCUMENTS

| | | | |
|---|---|---|---|
| 4,868,877 A | 9/1989 | Fischer | |
| 5,005,200 A | 4/1991 | Fischer | |
| 5,418,854 A | 5/1995 | Kaufman et al. | |
| 5,420,927 A | 5/1995 | Micali | |
| 5,497,421 A | 3/1996 | Kaufman et al. | |
| 5,642,419 A | 6/1997 | Rosen | |
| 5,666,416 A * | 9/1997 | Micali ................ | 713/158 |
| 5,982,898 A | 11/1999 | Hsu et al. | |
| 6,011,791 A | 1/2000 | Okada et al. | |
| 6,026,166 A | 2/2000 | LeBourgeois | |
| 6,035,402 A | 3/2000 | Vaeth et al. | |
| 6,085,320 A | 7/2000 | Kaliski, Jr. | |
| 6,189,098 B1 | 2/2001 | Kaliski, Jr. | |
| 6,212,634 B1 | 4/2001 | Geer, Jr. et al. | |
| 6,421,779 B1 * | 7/2002 | Kuroda et al. .......... | 713/169 |
| 6,671,804 B1 * | 12/2003 | Kent .................. | 713/175 |
| 6,718,470 B1 * | 4/2004 | Adams ................ | 713/175 |
| 2002/0062438 A1 * | 5/2002 | Asay et al. ........... | 713/157 |
| 2002/0073308 A1 * | 6/2002 | Benantar ............. | 713/155 |
| 2002/0120840 A1 * | 8/2002 | Yellepeddy et al. ...... | 713/156 |
| 2002/0144108 A1 * | 10/2002 | Benantar ............. | 713/156 |
| 2002/0184508 A1 * | 12/2002 | Bialick et al. ........ | 713/182 |
| 2005/0066164 A1 * | 3/2005 | Simon ................ | 713/156 |
| 2005/0114666 A1 * | 5/2005 | Sudia ................ | 713/175 |

* cited by examiner

*Primary Examiner*—Kim Vu
*Assistant Examiner*—Linh LD Son
(74) *Attorney, Agent, or Firm*—William Kinnaman; Cantor Colburn LLP

(57) ABSTRACT

A method for creating a proof of possession confirmation for inclusion by a certification authority into a digital certificate, the digital certificate for use by an end user, is disclosed. In an exemplary embodiment of the invention, the method includes receiving from the certification authority, in response to a certificate request by the end user, a plurality of data fields corresponding to a target host system, the end user, and a form of proof of identity possession by the end user. The content of the plurality of data fields is analyzed and the accuracy thereof is verified. If the plurality of data fields is verified as accurate, then a signed object is sent to the certification authority, the signed object comprising the proof of possession confirmation.

12 Claims, 2 Drawing Sheets

PASSWORD EXPOSURE ELIMINATION FOR DIGITAL SIGNATURE COUPLING WITH A HOST IDENTITY

BACKGROUND

PKI, or Public Key Infrastructure, is a set of operating system and application services that supports public key cryptography. Public key cryptography is an important technology for e-commerce, internet, intranet and other applications requiring "distributed security" (i.e., security in which the participants are not part of the same network and have no common security credentials). Specifically, public key cryptography provides two fundamental operations: encryption and signing. By encrypting electronic data, the goal is for the data to be read only by the intended party. With public key cryptography, a sender can encrypt a message using the specific public key corresponding to the receiver. In turn, only the receiver (using his or her private key) can decrypt the message.

On the other hand, signing is used to authenticate the identity of another party. Again, public key cryptography is involved, but in this instance a message may be encrypted by a sender's private key. Anyone can decrypt the message with the sender's corresponding public key, but the identity of the sender is established because the message could only have been encrypted by the sender's private key.

Public keys are typically packaged as digital certificates, which contain the public key, as well a set of other attributes such as the keyholder's name, what the keyholder is allowed to do, and under what circumstances the certificate is valid. The X.509 v3 digital certificate is an International Telecommunications Union (ITU) standard defining the format and content of digital certificates. The keyholder's attributes are cryptographically bound to the public key because the certificate is digitally signed by a Certificate Authority (CA) that issued it. The CA, or issuer, is a trusted entity associated with the keyholder; thus, the certificate's authenticity and correctness is vouched for by the issuer's signature.

In certain instances, however, the subject or keyholder identity carried in the digitial certificate may not exactly match the keyholder's identity on a particular host system. For example, FIG. 1 illustrates an exemplary representation of an X.509 v3 digital certificate 10 and an exemplary system registry 12 for a host server. As can been seen from the subject identity 14 included in the digital certificate, the particular formatting thereof does not correspond to the subject identity 16 in the system registry, even though they are one and the same. In order to establish authorization and gain access, therefore, a flexible means has been developed to include additional attributes within a digital certificate, in addition to the standard attributes. A host-identity mapping extension enables the coupling of a X.509 v3 digital certificate to a host application server, or separately to each of a set of such servers. The host-identity mapping extension may include additional attributes therein to provide proof of identity possession (PIP). For instance, the PIP field can include the password which corresponds to the identity on the host server. If the password and user id are properly accompanied by an appropriate signature, then access to a host server may be achieved.

However, host-identity mapping extensions used in digital certificates are not without drawbacks. This is particularly the case when dealing with an external or third party CA. If the CA is run by an organization outside the host system, then the authenticating secret (password) is exposed to an outside agency which may not necessarily be trustworthy. If the integrity of the CA is compromised, then the password could be used to impersonate the keyholder on the host system. Yet, if the password is not embedded in the extension, the host server must then rely upon the CA to be trustworthy enough to verify the validity of the subject id, without proof of identity possession. It may be appropriate for the host system to honor the host-identity mapping extension of a digital certificate if the certificate is issued by a local CA, but not honor the extension if the certificate is issued by a public or third party CA. Because most PKI software understands only a binary trust value as applied to CAs (i.e., "trusted" or "not trusted"), the digital signature coupling with host identities can be problematic.

SUMMARY

The above discussed and other drawbacks and deficiencies of the prior art are overcome or alleviated by a method for creating a proof of possession confirmation for inclusion by a certification authority into a digital certificate, the digital certificate for use by an end user. In an exemplary embodiment of the invention, the method includes receiving from the certification authority, in response to a certificate request by the end user, a plurality of data fields corresponding to a target host system, the end user, and a form of proof of identity possession by the end user. The content of the plurality of data fields is analyzed and the accuracy thereof is verified. If the plurality of data fields is verified as accurate, then a signed object is sent to the certification authority, the signed object comprising the proof of possession confirmation.

In a preferred embodiment, the plurality of data fields further includes a host name, a subject identification, a subject public key information and a sealed proof of possession. The content of the plurality of data fields is further analyzed by decrypting a proof of possession structure from the sealed proof of possession. A password and a key identifier are extracted from the proof of possession structure, and the correct key identifier is then calculated from the subject public key information. The accuracy of the plurality of data fields is verified if the host name is matched with an identity of the target host system, the decrypted password is matched with a valid password for the end user, and the decrypted key identifier is matched with the correct key identifier calculated from the subject public key information.

BRIEF DESCRIPTION OF THE DRAWINGS

Referring to the exemplary drawings wherein like elements are numbered alike in the several Figures.

DETAILED DESCRIPTION

Figure 1:
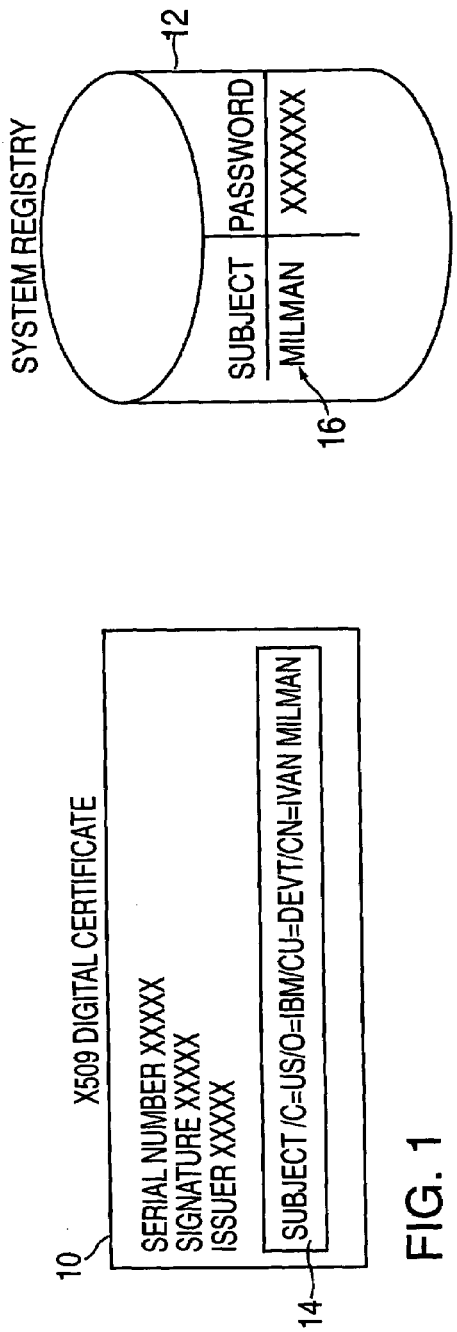
FIG. 1 illustrates representative drawings of information contained in a digital certificate and information contained in a system registry for a host server.
Figure 2:
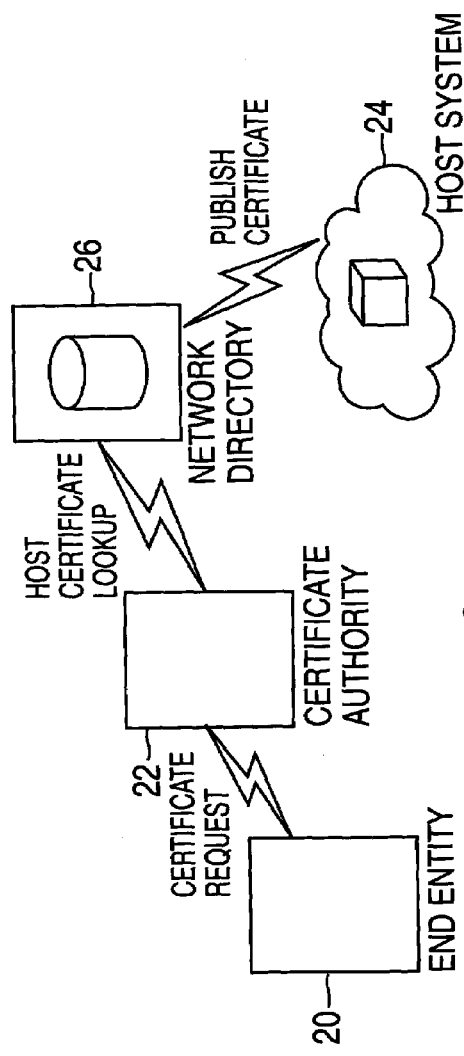
FIG. 2 is a block diagram illustrating the relationship between participating entities in certification of a host-identity mapping extension.

Referring initially to FIG. 2, there is shown a block diagram illustrating the relationship between participating entities in the issuance of a certificate with a host-identity mapping extension. An end entity 20 (also referred to as "end user" or "key holder"), has a digital certificate 10 (FIG. 1) issued by a certificate authority (CA) 22. As indicated earlier, however, the subject identity 14 for the end entity 20 on the digital certificate 10 may not correspond to the subject identity 16 associated with the end entity's use of a host system 24. Accordingly, a host identity mapping extension may be incorporated within digital certificate 10, which is of X.509 v3 format. The host identity mapping extension comprises a set of homogeneous structures, each of which may include additional identification attributes such as a host name, a subject identification name (matching, for example, subject identity 16 in a host system registry) and, optionally, a proof of identity possession (PIP) value. The structure of each of the homogeneous set of structures within such a host identity mapping extension may be implemented as shown below using Abstract Syntax Notation 1 (ASN.1) constructs:

```
HostIdMapping : : = SEQUENCE { -- original version
    hostName         [1] IMPLICIT IA5String,
    subjectID        [2] IMPLICIT IA5String,
    proofOfIdPossession IdProof     OPTIONAL
}
IdProof : : = SEQUENCE {
    secret                    OCTET STRING,
    encryptionAlgorithm OBJECT IDENTIFIER
}
```

With the proliferation of public key authentication technology, each host system 24 will ultimately be associated with a public key certificate. The public key certificate may be published in, and retrieved from, a public network directory 26 (much the same as a person's telephone number is published in telephone directory). In order to facilitate the incorporation of the additional attributes into the host identification mapping extension, the end entity 20 encrypts the proof of identity possession (typically a password) into the host identification mapping extension using the public key of the certificate authority 22 as part of a certificate request message. In response, the CA 22 decrypts the password with its own private key and then re-encrypts it using the public key of the host system 24, which was accessed through public network directory 26.

As also mentioned previously, a problem potentially arises whenever the CA 22 is run by a different organization than the host system 24. The end user 20 may be reluctant to send password information to the CA 22, knowing that if the CA 22 is compromised the password could be used to impersonate the end user 20 on the host system 24. On the other hand, if the host system 24 permits the use of a certificate not having the password for logging in, the host system also has to trust the CA 22 that the subject identification is genuine.

One possible solution to the above stems from the fact that because the public key of the target host system is accessible by the end user, the end user's password may be encrypted using that key instead of the CA's public key. In the alternative, the password may be symmetrically encrypted by using a randomly generated symmetric key, which symmetric key is then itself hidden by encryption using the target host's public key. This is a cryptographic process known as "enveloping".

However, in order to protect the target host system from a replay attack by an imposter, the password is encrypted or enveloped within a structure which may be referred to a "sealed proof of possession". The sealed proof of possession (sealed POP) is the encryption of a structure containing the password or other proof of identity possession, the key identifier of the certificate request's subjectPublicKey (calculated as the digest of the value of the subjectPublicKey bit string in the certificate request), and various padding. To exercise this feature, a client/user incorporates a host identifying mapping extension with a sealedPOP into the certificate request. The sealedPOP is prepared by first creating a clearSealedPOP structure with the following steps:

(1) setting the password field to the user's actual login password on the host system, or to another form of proof of identity possession verifiable by the host system such as a "ticket";
(2) finding the certificate request's subjectPublicKey;
(3) calculating the key identifier of the certificate request's subjectPublicKey as the SHA-1 digest of the value of the subjectPublicKey bit string; and
(4) generating a stream of random bytes of binary data and assigning it to the padding field.

Once the clearSealedPOP is prepared, the sealedPOP is created by encrypting the clearSealedPOP using the host's public key. Again, the encryption may be accomplished asymmetrically, resulting in a sealed POP. Or, if done symmetrically (enveloped) in PKCS #7 or Cryptographic Message Syntax format so that the encrypted symmetric key can only be read by the host, then the result is a longSealedPOP. In any case, the sealed proof of possession is placed into the host identity mapping extension, in lieu of the proof of identity possession (PIP) field described earlier, and then sent to the CA as part of the certification request. The sealedPOP may then be placed in the digital certificate as a result of the request.

When the end user presents such a digital certificate for authentication to the host system, the host recovers the password and key identifier by either (1) decrypting the ciphertext directly with the host system's private key, or (2) if enveloping is used, by first decrypting the symmetric key with the host system's private key and then decrypting the ciphertext with the decrypted symmetric key. Once the password is recovered, the host must still establish the absence of a replay attack by verifying that the key identifier matches that of the certificate subject public key.

It will be appreciated that the above described technique allows the password to be hidden from a certificate authority while also preventing a replay attack by an imposter, since the key in the certificate (or certificate request) is used to verify the key identifier in the sealed proof of possession. The host identification mapping extension cannot be used in a new counterfeit certificate, or as part of a counterfeit request for a new certificate, because the key identifier would not match the public key contained in the new certificate.

It will also be appreciated, however, that while the above described technique eliminates a password exposure problem, the password is still coupled with the digital certificate, even if the password is unreadable by the CA. If a user's password is changed over a period of time (as is often the case), the certificate then becomes unusable and a new one must be requested. Therefore, in accordance with an embodiment of the present invention, a method 100 for creating a proof of possession confirmation for inclusion by a certification authority into a digital certificate is disclosed. In effect, the target host acts as a registration authority (RA) for the certificate authority (CA) by "approving" the host identity mapping extension prior to the issuance of a digital certificate, and then placing a verification of identity or "proof of possession confirmation" signed by the target host system into the digital certificate. The proof of possession confirmation (POP confirmation) does not contain the password information and is used in the certificate in place of the sealed POP.

It should be noted at this point that a "target host system" as described herein need not be a single machine, or even a set of machines with a single network interface. Rather, a target host system is expected to have the property of sharing of non-public key authentication credentials, for some or all of a substantial subset of users, between nodes within the system. Furthermore, the target host system should also publish at least one public key for encryption purposes. For certificate requests containing either sealedPOP or IdProof, it is desirable that there be only one encryption key published for a target system. However, for longSealedPOP, this is unnecessary since the format used therefor includes the identity of the certificate containing the encryption key.

Figure 3:
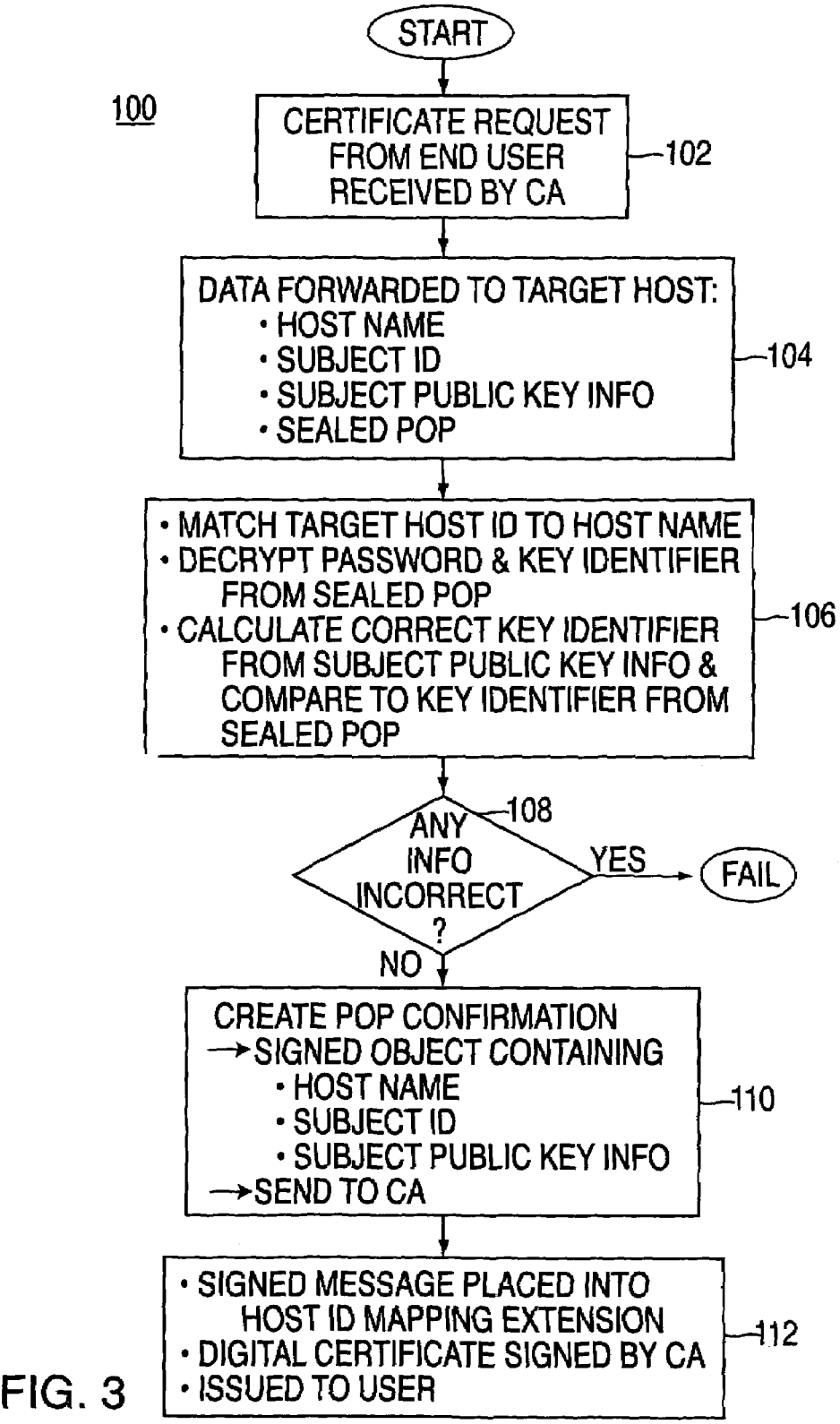
FIG. 3 is a flow diagram illustrating a method for creating a proof of possession confirmation for inclusion by a certification authority into a digital certificate, in accordance with an embodiment of the invention.

The implementation of method 100 is best understood by referring to the flow diagram in FIG. 3. Initially, a certificate request generated by an end user is received by the CA (or the RA associated with the CA) at block 102. The CA, in turn, forwards the data included in the request on to the target host system at block 104. The forwarded data within the proof of possession structure includes: the host name, the subject ID, the SubjectPublicKeyInfo field and the sealed proof of possession field created by the end user. At block 106, the target host matches its identification to the host name. The password and key identifier are then decrypted, as described earlier, from the sealed proof of possession data. Then, the host calculates the correct key identifier of the Subject Public Key and compares it to the key identifier decrypted from the sealedPOP. Assuming the key identifier is valid, the host then verifies that the decrypted password is valid for the specified user.

If at decision block 108 it is determined that any of the information is not correct, then the certificate request fails. However, if all of the information is correct, method 100 proceeds to block 110 where the host system creates a proof of possession confirmation by sending back to the CA a signed object containing all of the data described in block 104, except for the sealed proof of possession field which contains the password. Finally, at block 112, the signed message is then placed into the host identity mapping extension of the digital certificate by the CA, which digital certificate is then signed by the CA and issued to the user.

The updated ASN.1 definition for the resulting host identity mapping extension, which now includes the proof of possession confirmation, is given by:

```
HostIdMapping : : = SEQUENCE { -- revised definition
        hostName      [1] IMPLICIT IA5String,
        subjectID     [2] IMPLICIT IA5String,
        idproofs CHOICE {
            proofOfIdPossession IdProof,
            sealedPOP       OCTET STRING,
            longSealedPOP [3] IMPLICIT Enveloped Data,
            POPConfirmation   [4] IMPLICIT SignedData --
                never in request, only in cert
        } OPTIONAL
    }
``` where SignedData and EnvelopedData are defined by PKCS #7 (RFC 2315). The encrypted content of sealedPOP and longSealedPOP contains the following structure:

```
clearSealedPOP : : = SEQUENCE {
        password CHOICE   {
            simple    PrintableString,
            intl      UTF8String,
            ascii     IA5String,
            binary    OCTET STRING
        },
        keyId     KeyIdentifier,
        padding   [0] IMPLICIT OCTET STRING
    OPTIONAL
    }
```

It should be noted that the KeyIdentifier in this instance must be calculated as the digest of the value of the subjectPublicKey bit string, preferably using SHA-1 as the digest algorithm. Other digest algorithms, however, are also contemplated. It should also be noted that the KeyIdentifier will be verified against the key of the certificate, rather than being verified against the SubjectKeyIdentifier extension. Finally, the signed content of the POPConfirmation contains the ConfirmedHostId structure, given below:

```
signedContent : : = ConfirmedHostID
ConfirmedHostID : : = SEQUENCE {
        hostName    [1] IMPLICIT IA5String,
        subjectID   [2] IMPLICIT IA5String,
        CHOICE              {
            keyInfo     SubjectPublicKeyInfo
            KeyID       KeyIdentifier
        }
    }
```

Thus configured, the host identity mapping extension included in a digital certificate provides another alternative for proof of possession. When a target host receives a certificate with a signed message in the extension, the host may verify that it signed the message, that it is the host mentioned in the signed message, and that all the fields contained in the signed message match the certificate fields. If successful, the host accepts the credentials presented by the user.

The present invention can include embodiments in the form of computer-implemented processes and apparatuses for practicing those processes. The present invention can also include embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also include embodiments in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It is also explicitly contemplated that other data types, in addition to those described above, may be used to encode arguments given within a specific type. For example, changes to tagging and to string type are contemplated. In addition, where feasible, the use of XML instead of ASN.1 may be implemented as an encoding technique.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of creating a proof of possession confirmation for inclusion by a certification authority into a digital certificate, the digital certificate for use by an end user, the method comprising:

receiving, from the certification authority in response to a certificate request by the end user, a plurality of data fields corresponding to a target host system, the identity of the end user, and a proof of identity possession by the end user, said plurality of data fields Further comprising a host name, a subject identification, a subject public key information, and a scaled proof of possession;

analyzing the content of said plurality of data fields by decrypting a proof of possession structure from said scaled proof of possession, extracting a password from said sealed proof of possession structure, extracting a key identifier from said proof of possession stricture and calculating a correct key identifier from said subject public key information;

verifying the accuracy of said plurality of data fields; and if said plurality of data fields is verified as accurate, sending a signed object to the certification authority, said signed object comprising the proof of possession confirmation, wherein said proof of possession confirmation is constructed in a manner so as to prevent replay attacks by an impostor.

2. The method of claim 1, wherein the accuracy of said plurality of data fields is verified if:

said host name is matched with an identity of said target host system;

said extracted password is validated as a valid password for the end user; and said extracted key identifier is matched with said correct key identifier calculated from said subject public key information.

3. The method of claim 1, wherein said extracted password and said extracted key identifier are initially symmetrically encrypted.

4. The method of claim 1, wherein said extracted password and said extracted key identifier are initially asymmetrically encrypted.

5. The method of claim 1, wherein:

said plurality of data fields includes a password; and said signed object does not include said password.

6. The method of claim 1, wherein said sealed proof of possession is verifiable for compatibility with at least one other of said plurality of data fields of said certificate request.

7. A computer-readable storage medium comprising:

a computer readable program code for creating, a proof of possession confirmation for inclusion by a certification authority into a digital certificate, the digital certificate for use by an end user; and instructions for causing a computer to implement a method, the method further comprising:

receiving, from the certification authority in response to a certificate request by the end user, a plurality of data fields corresponding to a target host system, the identity of the end user, and a proof of identity possession by the end user, said plurality of data fields further comprising a host name, a subject identification, a subject public key information, and a sealed proof of possession;

analyzing the content of said plurality of data fields by decrypting a proof of possession structure from said sealed proof of possession, extracting a password from said sealed proof of possession structure extracting a key identifier from said proof of possession structure and calculating a correct key identifier from said subject public key information;

verifying the accuracy of said plurality of data fields; and if said plurality of data fields is verified as accurate, sending a signed object to the certification authority, said signed object comprising the proof of possession confirmation, wherein said proof of possession confirmation is constructed in a manner so as to prevent replay attacks by an impostor.

8. The storage medium of claim 7, wherein the accuracy of said plurality of data fields is verified if:

said host name is matched with an identity of said target host system;

said extracted password is validated as a valid password for the end user; and said extracted key identifier is matched with said correct key identifier calculated from said subject public key information.

9. The storage medium of claim 7, wherein said extracted password and said extracted key identifier are initially symmetrically encrypted.

10. The storage medium of claim 7, wherein said extracted password and said extracted key identifier are initially asymmetrically encrypted.

11. The storage medium of claim 7, wherein:

said plurality of data fields includes a password; and said signed object does not include said password.

12. The storage medium of claim 7, wherein said sealed proof of possession is verifiable for compatibility with at least one other of said plurality of data fields of said certificate request.

* * * * *